United States Patent [19]

Wolter et al.

[11] 4,320,108

[45] Mar. 16, 1982

[54] PROCESS FOR THE REMOVAL OF METALS FROM CARBON BLACK

[75] Inventors: Manfred Wolter, Hürth; Gero Heymer, Erftstadt, both of Fed. Rep. of Germany

[73] Assignee: Hoechst Aktiengesellschaft, Frankfurt am Main, Fed. Rep. of Germany

[21] Appl. No.: 203,531

[22] Filed: Nov. 3, 1980

[30] Foreign Application Priority Data

Nov. 17, 1979 [DE] Fed. Rep. of Germany ....... 2944916

[51] Int. Cl.[3] .............................................. C01B 31/02

[52] U.S. Cl. ..................................... 423/461; 210/705

[58] Field of Search ................ 423/461, 460; 210/705; 264/117; 209/162

[56] References Cited

U.S. PATENT DOCUMENTS

| | | | |
|---|---|---|---|
| 2,149,671 | 3/1939 | Franck et al. | 423/461 |
| 2,725,985 | 12/1955 | Howard et al. | 210/705 |
| 2,894,603 | 7/1959 | Vasan | 210/705 X |
| 3,226,316 | 12/1965 | Metrailer et al. | 423/461 X |

FOREIGN PATENT DOCUMENTS

| | | | |
|---|---|---|---|
| 2515633 | 10/1978 | Fed. Rep. of Germany . | |
| 38-26855 | 12/1963 | Japan | 423/461 |
| 45-17283 | 6/1970 | Japan | 423/461 |
| 1522459 | 8/1978 | United Kingdom | 423/461 |

*Primary Examiner*—Edward J. Meros

*Attorney, Agent, or Firm*—Connolly and Hutz

[57] ABSTRACT

The invention relates to a process for the removal of metals, especially of iron and/or nickel and/or vanadium or their compounds, from carbon black. To this end, the invention provides for an aqueous carbon black suspension to be heated to a temperature of about 30° to 90° C., for chlorine to be passed therethrough with agitation. The chlorine gas is used in a stoichiometric excess, based on the metal content of the aqueous carbon black suspension. Next, the carbon black is separated from the aqueous suspension and dried.

6 Claims, No Drawings

PROCESS FOR THE REMOVAL OF METALS FROM CARBON BLACK

The invention relates to a process for the removal of metals from carbon black by treating an aqueous carbon black suspension with an agent suitable for dissolving the metals, if appropriate at an elevated temperature, separating off the carbon black from the suspension and recovering the carbon black so purified.

The combustion or partial gasification of oil or heavy oil, with the use of air or oxygen and, if appropriate, stem, results in the formation of carbon black which partially contains substantial amounts of metals or metal compounds originating from the metal(s) contained in the fuel or gasification raw material. Typical metal components are iron, vanadium and nickel, which are present in the carbon black in a proportion of between about 0.1 and 10% by weight, for example, in those cases in which the fuel subjected to combustion or gasification is a residue originating from the distillation of crude oil under vacuum. Carbon black obtained upon the combustion of such an oil is difficult to dispose of as metal(s) contained therein is (are) liable to corrode the combustion chamber. Apart from this, the carbon black contains metals which are rendered valuable by their price so that it is desirable for the metals or metal compounds contained therein to be removed and utilized.

On the other hand, it is also desirable to have pure carbon black which has properties highly desirable for certain uses. In fact, it is not allowable for carbon black intended for further uses to contain more than a certain maximum of metal contaminants, in order to avoid harmful side-effects of the metals, for example catalytic effects or corrosion.

It is therefore highly desirable to have a process permitting metals to be removed from carbon black originating from the combustion or gasification of oil, the metals and purified carbon black being suitable for further use.

German Offenlegungsschrift No. 2,717,303 discloses a process for the recovery of metals, such as vanadium, from carbon black obtained on combustion of oil, the carbon black being extracted by means of an alkaline liquor and the metals being recovered from the alkaline liquor, preferably by liquid-liquid extraction. In this process, the carbon black is extracted with an aqueous sulfuric acid solution, having a pH value of 1 to 2, and a portion of the metal is extracted. Next, the carbon black so treated is subjected to combustion in a furnace at 600° to 1,200° C. The combustion residue is extracted with an aqueous solution of sulfuric acid, having a pH value of 0 to 2, in order to recover additional metal from the combustion residue.

It is a disadvantage of this known process that two process steps are required to remove the metals from the carbon black. Furthermore, in the second process step the carbon black is subjected to combustion for as long as necessary to obtain an ash residue whereby further use of the carbon black is rendered impossible. In other words, this is a process relating exclusively to metal recovery.

In those cases in which the carbon black used as feed material is one which is obtained in the form of an aqueous suspension containing 0.5 to 4% by weight of solid matter, the suspension being obtained by subjecting heavy oil or liquid or gaseous hydrocarbons to combustion at temperatures of between 1,200° and 2,000° C. and pressures of between 1 and 80 bar, with admission of air or oxygen and steam, if desired, and scrubbing the carbon black-containing gas stream with water (compare German Auslegeschrift No. 2,515,633), it is customary for such suspensions to be treated with sulfuric acid at pH 1 and 90° C. for 24 hours, with agitation. This treatment in fact permits 90% by weight of the vanadium to be removed from the carbon black isolated from the suspension, but only permits about 50% by weight of the iron and 30% by weight of the nickel to be removed therefrom. The replacement of sulfuric acid by hydrochloric acid or nitric acid, or the addition of an oxidizing agent, such as hydrogen peroxide or potassium permanganate, to the sulfuric acid solution, could not be found to add to improving the solubility of these metals.

The present invention now unexpectedly provides a process wherein the carbon black suspension described above is treated with chlorine gas at an elevated temperature with the resultant removal, by dissolution, inter alia of 90 to 98% by weight of the nickel from the carbon black.

The invention relates more particularly to a process for the removal of metals, especially of iron and/or nickel and/or vanadium or their compounds, from carbon black by treating an aqueous suspension of the carbon black with an agent suitable for dissolving the metals or their compounds, at an elevated temperature, if desired, and separating the carbon black from the suspension, which comprises passing chlorine gas with agitation through the aqueous carbon black suspension, having a temperature of about 30° to 90° C., separating the carbon from the aqueous suspension and drying it, the chlorine being used in a stoichiometric excess, based on the metal content of the carbon black.

The carbon black used in accordance with this invention may contain about 0.05 to 3% of iron and/or about 0.05 to 2% nickel and/or about 0.05 to 5% of vanadium or compounds of these elements.

In those cases in which the feed material used in the process of this invention is carbon black which has been obtained by thermal conversion of hydrocarbons which are liquid or gaseous under normal conditions, in the presence of oxygen or an oxygen-containing gas and optionally of steam, at temperatures of about 1,200° to 2,000° C. and under pressures of about 1 to 80 bar, the separation, in accordance with this invention, of the carbon black from the carbon black-containing gas stream by means of water, invariably results in the formation of an aqueous suspension containing about 0.5 to 4% by weight of solid matter. This is a carbon black suspension permitting chlorine gas to be passed therethrough in an excess which amounts to about 10 to 100 times the amount stoichiometrically required, based on the metal content of the carbon black, the chlorine gas being passed through the aqueous soot suspension over a period within the range about 15 to 180 minutes. This processing step is based on the assumption that the highly reducing environment causes the metals to be present in the carbon black in their zero-valency state, that is to say in elementary form, and that they are oxidized by the chlorine supplied.

More specifically, Fe is oxidized to $Fe^{3+}$, V to $V^{5+}$ and Ni to $Ni^{2+}$. Even in the evant of only a portion of the metals being present in elementary form and another portion in the form of compounds, for example as sulfides, it is necessary to use an excess of $Cl_2$.

The process of this invention has also been found to produce technically beneficial results in all those cases in which the carbon black directly isolated from the gasification process or combustion off-gases are obtained in the form of pulverulent free-flowing material of which the metal content is too high to permit further use.

In this event, it is merely necessary for the carbon black to be suspended in water and preferable for the resulting suspension to contain 5 to 30 g/l of solid matter. Suspensions with higher concentrations of solid matter therein present a high viscosity. They are naturally considerably more difficult to stir or to convey by pumping, and it is difficult for chlorine to be passed therethrough.

A further preferred embodiment of the process according to the invention provides for a straight-chain alcohol, preferably n-amyl alcohol, or a methyl ester or ethyl ester of an aliphatic monocarboxylic acid with 2 to 4 C-atoms to be added to the aqueous carbon black suspension, in a proportion of 5 to 15 g of alcohol or ester per gram of suspended carbon black, so as to separate the carbon black in the form of granular material. After stirring for 1 to 3 minutes, the carbon black floats as a granular material on the water surface from which it can readily be recovered, for example by filtration. The material thus obtained contains about 10% by weight of carbon black, 30 to 40% by weight of water and 50 to 60% by weight of alcohol. Next, it is heated to about 150°-350° C. to evaporate alcohol and water, vaporous matter is condensed, the aqueous and alcoholic phases are separated and the alcohol, which is now saturated with water, is re-used for separation of further carbon black. Condensed water, which always contains some dissolved alcohol, is disposed of. Next, the filtrate coming from the carbon black separation stage is treated in conventional manner, for example by liquid-liquid extraction (compare C. HANSON: "Pecent Advances in Liquid-Liquid Extraction", Pergamon Press, Oxford 1971) so as to recover the metals or metal compounds therefrom.

The process of the invention may be carried out discontinuously, for example in an agitator-provided vessel, or continuously, in which case it is advantageous to use a bubble column or packed scrubbing tower for passing chlorine gas through the aqueous suspension and a suitable agitator-provided vessel for the subsequent separation of the carbon black.

The process of the invention compares favorably with the prior art methods inasmuch as it permits 90 to 95% of the iron and vanadium and 98% of the nickel to be removed from the carbon black, in a single processing stage. Furthermore, it permits the recovery of carbon black, whose favorable properties make it suitable for a variety of uses. Finally, the use of certain alcohols and esters to effect the separation of carbon black from the aqueous carbon black suspension results in the formation of a granular product which can be separated from the organic/aqueus phase without difficulties, for example by filtration.

EXAMPLE 1

(Comparative Example)

An aqueous carbon black suspension which contained 0.6% by weight of carbon black and was obtained on subjecting heavy oil to gasification at 1,500° C. and 60 bar by scrubbing the resulting carbon black-containing gas stream, and which contained 4,500 ppm of Fe, 3,200 ppm of V and 6,500 ppm of Ni, was mixed with an amount of sulfuric acid sufficient for the resulting suspension to contain 10% by weight of sulfuric acid. After heating the carbon black suspension to 90° C., it was stirred at this temperature for 24 h, and the carbon black was then separated from the water by adding 10 g of n-amyl alcohol/g of carbon black. Next, the whole was filtered. Alcohol and water were expelled from the filter residue, and carbon black which still contained 2,100 ppm of Fe, 290 ppm of V and 4,500 ppm of Ni was obtained,.

EXAMPLE 2

(Invention)

4 liters of an aqueous carbon black suspension which contained 0.6 % by weight of solid matter, 6,300 ppm of Fe, 2,500 ppm of V and 5,800 ppm of Ni, were heated to 70°-80° C., and 20 liters of chlorine gas, corresponding to a 90-fold stoichiometric excess of chlorine, were passed therethrough with agitation and within one hour, and the carbon black was then separated from the aqueous phase by adding 10 g of n-amyl alcohol/g of carbon black. The carbon black was filtered, alcohol and water were expelled at a temperature of 200° C., and carbon black which contained 200 ppm of Fe, 300 ppm of V and 170 ppm of Ni was obtained.

EXAMPLE 3

(Invention)

The procedure was analogous to Example 2 except that the n-amyl alcohol was replaced by 8 g of methyl acetate/g of carbon black. The carbon black, freed from ester and water, contained 220 ppm of Fe, 350 ppm of V and 180 ppm of Ni.

EXAMPLE 4

(Invention)

The procedure was analogous to Example 2 save that the 20 liters/h of chlorine gas were replaced by 10 liters/h, corresponding to an about 45-fold stoichiometric excess, which was passed through the carbon black suspension; the carbon black, freed from alcohol and water, contained 440 ppm of Fe, 330 ppm of V and 190 ppm of Ni.

EXAMPLE 5

(Invention)

The feed material was 4 liters of an aqueous carbon black suspension which contained 15 g/l of solid matter. It was prepared by stirring carbon black into water. It was carbon black which had been isolated as a free-flowing material from a stream of gas originating from the gasification of heavy oil. The carbon black contained 0.42% of Fe, 1.05% of V and 0.77% of Ni.

Chlorine gas, corresponding to a 10-fold stoichiometric excess, was passed into the suspension over one hour at 80° C. Next, 15 g of n-amyl alcohol/g of carbon black were added and the carbon black was separated as a granular material by filtration. The product, freed from water and alcohol at a temperature of 200° C., contained 240 ppm of Fe, 540 ppm of V and 110 ppm of Ni. 9n

We claim:

1. A process for the removal of metals selected from the group consisting of iron, nickel, vanadium and their compounds, from carbon black, which comprises: treating, with agitation, an aqueous suspension of the carbon black having a solid matter content of 0.5 to 4% by weight and a temperature of 30° to 90° C., with chlorine gas by passing said chlorine gas into the aqueous suspension over a period of 15 to 180 minutes; said chlorine gas being employed in 10 times to 100 times the stoichiometrically required proportion, based on the metal content of the carbon black; separating the carbon black from the aqueous suspension in the form of granular material by adding 5 to 15 g, per gram of suspended carbon black, of a straight-chain alcohol with 4 to 9 C-atoms to said suspension; and freeing the carbon black from adhering water and alcohol by heating to 150° to 350° C.

2. A process for the removal of metals selected from the group consisting of iron, nickel, vanadium and their compounds, from carbon black, which comprises: treating, with agitation, an aqueous suspension of the carbon black having a solid matter content of 0.5 to 4% by weight and a temperature of 30° to 90° C., with chlorine gas by passing said chlorine gas into the aqueous suspension over a period of 15 to 180 minutes; said chlorine gas being employed in 10 times to 100 times the stoichiometrically required proportion, based on the metal content of the carbon black; separating the carbon black from the aqueous suspension in the form of granular material by adding 5 to 15 g, per gram of suspended carbon black, of an ester of an aliphatic monocarboxylic acid with 2 to 4 C-atoms to said suspension; and freeing the carbon black from adhering water and ester by heating to 150° to 350° C.

3. The process as claimed in claim 1 or 2, wherein the carbon black present in the aqueous suspension contains metals selected from the group consisting of iron (0.05 to 3%), nickel (0.05 to 2%), vanadium (0.05 to 5%) and compounds of these elements.

4. The process as claimed in claim 1, wherein n-amyl alcohol is used as the straight-chain alcohol.

5. The process as claimed in claim 2, wherein the carbon black suspension is admixed with a methyl ester.

6. The process as claimed in claim 2, wherein the carbon black suspension is admixed with an ethyl ester.

* * * * *